United States Patent [19]

Rostler

[11] 3,900,692

[45] *Aug. 19, 1975

[54] METHODS FOR MODIFYING ASPHALTS AND EMULSIONS USEFUL THEREFOR

[75] Inventor: Fritz S. Rostler, Berkeley, Calif.

[73] Assignee: Phillips Petroleum Company, Bartlesville, Okla.

[ * ] Notice: The portion of the term of this patent subsequent to May 4, 1988, has been disclaimed.

[22] Filed: Jan. 8, 1973

[21] Appl. No.: 321,571

Related U.S. Application Data

[60] Division of Ser. No. 142,067, May 10, 1971, Pat. No. 3,769,246, which is a continuation-in-part of Ser. No. 108,596, Jan. 21, 1971, Pat. No. 3,763,074, which is a division of Ser. No. 714,424, March 30, 1968, Pat. No. 3,577,250.

[52] U.S. Cl. ............... 428/489; 106/278; 106/279; 106/280; 106/281; 260/28.5 AS; 260/29.7 EM; 260/33.6 AQ
[51] Int. Cl.$^2$.. B44D 1/09; C09D 3/48; C09D 11/10
[58] Field of Search ........... 106/278, 279, 280, 281; 260/28.5 AS, 29.7 EM, 33.6 AQ; 117/161 A, 117/161 UZ, 161 UD; 404/31, 32

[56] References Cited
UNITED STATES PATENTS

| | | | |
|---|---|---|---|
| 3,404,108 | 10/1968 | Regenstein | 260/33.6 AQ |
| 3,479,313 | 11/1969 | Kreider | 260/33.6 AQ |
| 3,562,193 | 2/1971 | Leeks | 260/33.6 AQ |
| 3,577,250 | 5/1971 | Rostler | 106/278 |
| 3,763,068 | 10/1973 | Schuler | 260/28.5 AS |
| 3,763,074 | 10/1973 | Rostler | 260/29.7 GP |
| 3,769,246 | 10/1973 | Rostler | 260/33.6 AQ |

*Primary Examiner*—Ralph S. Kendall
*Assistant Examiner*—Harris A. Pitlick

[57] ABSTRACT

This invention relates to the improvement of the rheological properties of asphalts in addition to the durability of asphalts by modification of the asphaltenes fraction and/or the maltenes fraction of an asphalt by adding thereto elastomers. This may be accomplished by adding either an n-pentane-soluble polymer or an n-petane-soluble polymer or an n-pentane-insoluble polymer or a mixture of the two.

16 Claims, No Drawings

METHODS FOR MODIFYING ASPHALTS AND EMULSIONS USEFUL THEREFOR

BACKGROUND OF THE INVENTION

This application is a division of application Ser. No. 142,067, filed May 10, 1971, now U.S. Pat. No. 3,769,246, which is a continuation in part of application Ser. No. 108,596 filed Jan. 21, 1971, now U.S. Pat. No. 3,763,074, which, in turn, is a division of Ser. No. 714,424, filed Mar. 30, 1968 now U.S. Pat. No. 3,577,250 issued May 4, 1971.

In previous work, the Applicant has shown that the durability of an asphalt is a function of the chemical composition of the maltenes fraction, that is, the ratio of the reactive to the non-reactive components of the maltenes fraction.

It has been established that the durability of highway asphalts depends upon the ratio of the sum of the nitrogen bases (N) and first acidaffins ($A_1$) to the sum of the paraffins (P) and second acidaffins ($A_2$) of the maltenes fraction of asphalts as determined by ASTM Method D2006.

In accord with the present invention asphalts are defined as composed of three functional components affecting compatibility. These components are the asphalt portions which may be designated as "bodying agents," "solvent" in which the "bodying agent" is dissolved and "gelling agent" which is responsible for the limited compatibility of the bodying agent with the solvent and thus the rheological properties of the asphalt. I have found that the addition of a polymer in a manner to produce a homogeneous solution produces a new type of rubberized asphalt cement which is an asphalt modified by the polymer in which the polymer is functionally either a part of the bodying agent or the solvent or the gelling agent. In a non-modified asphalt the bodying agent is analytically defined and quantitatively determined as fraction A, the pentane asphaltenes. The solvent is the chemically reactive portion of the maltenes comprising the fractions N, $A_1$ and $A_2$ and the gelling agent is defined and determined as fraction P, i.e. paraffins, the chemically least reactive fraction of the maltenes.

Asphalts may be classified in accordance to their durability into five classes according to the value of the ratio ($N+A_1$)/($P+A_2$). Table I shows this classification. The parameter ($N+A_1$)/($P+A_2$) is useful for predicting the performance of normally available asphalts as measured in the laboratory by the pellet abrasion test. While this correlation between maltenes composition and performance is valid for normal, non-modified asphalts, I have found that this is not the case with asphalts which have been modified by addition of an elastomer. The advantages obtainable by addition of elastomers have been described in my preceding U.S. Pat. No. 3,577,250. Additional advantages may be obtained by addition of several elastomers.

TABLE I

DURABILITY RATING OF ASPHALTS FROM 60 to 100 PENETRATION GRADE

| GROUP RATING | $N+A_1$*/$P+A_2$ | Average Abrasion Loss** % | mg/revolution | DURABILITY |
|---|---|---|---|---|
| O*** | <0.4 | — | — | Decreasing durability with decreasing parameter value |
| I | 0.4–1.0 | 0–10 | 0.00–0.40 | Superior |
| II | 1.0–1.2 | 5–15 | 0.20–0.60 | Good |
| III | 1.2–1.5 | 10–40 | 0.40–1.60 | Satisfactory |
| IV | 1.5–1.7 | 30–60 | 1.20–2.40 | Fair |
| V | >1.7 | >50 | >2.00 | Inferior |

*Based on original composition
**Average of abrasion at 77°F. (pellet method) before and after aging 7 days at 140°F.
***Cheesy and putty-like products of consistency not associated with highway asphalt.

In my previous patent, mentioned above, I have shown how to improve asphalt quality by incorporation of an elastomeric polymer. The abrasion resistance of the modified asphalt is improved by such addition. The properties of asphalt such as viscosity, temperature sensitivity, etc., may also be improved by the addition of elastomers. My present invention deals with improving these primarily rheological properties in addition to attaining the benefits of increased abrasion resistance. These effects can be obtained selectively by using selected elastomers or a combination of elastomers of different types which affect preferentially one of the three functional components, i.e., either the bodying agent or the solvent or the gelling agent. I can accomplish a variety of additional effects, i.e., modification of the bodying agent or solvent, or the gelling agent, by adding elastomer to the asphalt to attain the overall effect of improved abrasion resistance. As mentioned above, engineers who are charged with the responsibility of selecting a material for a specific purpose often desire in addition to this overall effect, certain rheological properties contingent on the solvent viscosity or the effectiveness of the gelling agent. I have now found that by choosing the proper polymer the rheological properties can be altered at will. If, for instance, an asphalt is deficient in paraffins to produce a gel asphalt of a high Penetration Index, this can be corrected simultaneously with achieving the overall rubberizing effect of increased durability by employing a polymer of the saturated hydrocarbon type, e.g., butyl rubber. If an asphalt is deficient because of the viscosity of the maltenes, this can be corrected by using a polymer of the unsaturated hydrocarbon type, e.g., natural rubber (See Table XII). If an asphalt is deficient in properties contingent on molecular weight of the asphaltenes, I can correct this deficiency by employing an n-pentane-insoluble polymer such as a poly(styrene)-poly(diene)poly(styrene) block copolymer. By using a combination of polymers I can correct several deficiencies simultaneously.

According to the above mentioned ASTM Method D2006, the fraction precipitated by the pentane is termed asphaltenes. Such asphaltenes are a mixture of asphaltenes of various molecular weights which are distinguished from each other by their solubility in straight chain saturated hydrocarbons of different chain length. The total pentane asphaltenes are those symbolized in the above test as A. In order to differentiate between the subdivisional fractions of the asphaltenes component A, the pentane asphaltenes are also herein symbolized by the symbol $A_{5c}$. The $A_{5c}$ asphaltenes contain asphaltenes which are soluble in heptane and asphaltenes which are insoluble in heptane. These latter asphaltenes which are insoluble in heptane are symbolized by the symbol $A_{7c}$. The pentane asphaltenes and the $A_{7c}$ also contain asphaltenes which are soluble in nonane and asphaltenes that are insoluble in nonane. The asphaltenes which are insoluble in nonane are referred to by the symbol $A_{9c}$.

The components of the maltenes are designated according to the test, referred to above, as nitrogen bases (N), first acidaffins ($A_1$), second acidaffins ($A_2$) and paraffins (P). The ratio of these components are shown in Table I for asphalts of various durability groups as measured by abrasion resistance and as predicted by the parameter $(N+A_1)/(P+A_2)$. As will be shown later there is good agreement between predicted and measured durability for normal non-modified asphalts but addition of polymer causes improvement in measured durability to the extent that it overrules the predictions made on the basis of the parameter $(N+A_1)/(P+A_2)$.

Table II demonstrates that the added pentane-insoluble polymer becomes part of the asphaltenes fraction.

In the experiments summarized in Table II the asphalt was modified by the addition of a terminal block copolymer of the composition poly(styrene)-poly(butadiene)-poly(styrene). The particular polymer used in the tests described in Table II was a polymer produced by Phillips Petroleum Company under the designation Solprene GEO. Other similar n-pentane-insoluble polymers but soluble in the functional portion of the maltenes labeled solvent i.e. the components (N), ($A_1$), and ($A_2$) can also be used. Examples of such other polymers are other terminal block copolymers as shown in Table III and described in my earlier patent mentioned above, neoprene which is poly(chloroprene) and other polymers which are insoluble in n-pentane but soluble in the functional portion of the maltenes labeled solvent.

TABLE II

ANALYSIS OF A 60/70 PENETRATION ASPHALT WITH POLYMER ADDED

| Polymer Content | % | 0 | 1 | 2 | 5 | 15 |
|---|---|---|---|---|---|---|
| Fraction $A_{5c}$ | % (m.) | 10.7 | 11.4 | 11.4 | 11.7 | 15.1 |
|  | (c.) | — | 11.2 | 11.5 | 12.3 | — |
| AMW |  | 3750 | 4120 | 4880 | 6190 | 20,000+ |
| Fraction $A_{7c}$ | % (m.) | 7.0 | 7.5 | 7.7 | 8.6 | 15.0 |
| AMW |  | 5410 | 5950 | 6980 | 9750 | 20,000+ |
| Fraction $A_{9c}$ | % (m.) | 5.5 | 5.9 | 6.5 | 8.1 | 14.4 |
| AMW |  | 6270 | 6580 | 8230 | 9250 | 20,000+ |
| Fraction N | % (m.) | 42.3 | 40.2 | 38.7 | 34.6 | 16.9 |
|  | (c.) | — | 40.4 | 38.7 | 33.7 | — |
| Fraction $A_1$ | % (m.) | 13.2 | 13.1 | 13.5 | 13.6 | 13.3 |
|  | (c.) | — | 13.2 | 13.2 | 13.2 | — |
| Fraction $A_2$ | % (m.) | 20.8 | 22.3 | 23.5 | 27.6 | 42.7 |
|  | (c.) | — | 22.3 | 23.7 | 28.1 | — |
| Fraction P | % (m.) | 13.8 | 13.0 | 12.9 | 12.5 | 12.0 |
|  | (c.) | — | 12.9 | 12.9 | 12.7 | — |

Fraction $A_{5c}$ = "pentane asphaltenes", precipitated by normal pentane, elsewhere referred to as "Fraction A".
Fraction $A_{7c}$ = "heptane asphaltenes", precipitated by normal heptane.
Fraction $A_{9c}$ = "nonane asphaltenes" precipitated by normal nonane.
AMW = average molecular weight.
(m.) = measured
(c.) = calculated The asphaltenes fraction $A_{5c}$ is composed of various molecular weight components and contains $A_{7c}$ molecular weight material and $A_{9c}$ molecular weight material. The average molecular weights of the polymers added are in the range of higher than 50,000 and usually above 100,000. The molecular weight reported for the asphaltenes in this specification was determined with the MECHROLAB Vapor Pressure "Osmometer," which measures average molecular weights up to approximately 20,000. In the tests summarized in Table II the asphalt was blended with a 15% solution of the polymer as shown in the last column to introduce 1, 2 and 5% of the polymer into the asphalt. The table shows the pentane asphaltenes $A_{5c}$ as percent measured and percent calculated from the composition of the blending ingredients employed. For the heptane asphaltenes $A_{7c}$ are reported the measured values and the average molecular weight of that fraction. The percent nonane asphaltenes reported as $A_{9c}$ are the percent measured. The maltenes fractions are reported both as determined by analysis and as calculated from the composition of the asphalt and the 15% polymer solution. Comparison of the calculated and measured values for the composition of the blends made from the asphalt and the 15% polymer solutions shows excellent agreement verifying the reliability of the analysis and the applicability of the test to these blends. It will be observed that the polymer addition increases the high-molecular weight portion of the nonane asphaltenes determined as $A_{9c}$ proportionately to the amount of polymer added. While I do not wish to be bound by any theory of the action of the added polymers, I have found that the addition of an n-pentane-insoluble polymer of sufficiently high molecular weight materially increases the molecular weight of the asphaltenes and the addition of an n-pentane-soluble high molecular weight polymer modifies the maltenes fraction and that the addition of such polymers which analytically become part of the maltenes or the asphaltenes respectively increase the abrasion resistance and therefore improves the quality of an asphalt far above that as governed by the parameter $(n+A_1)/P+A_2)$ in terms of the fractional components of the maltenes.

It is an object of this invention to upgrade asphalts, either unweathered or weathered asphalts, by incorporating therein elastomers to alter the asphaltenes composition and/or the composition of the maltenes fraction.

It is a further object of this invention to increase the average molecular weight of the asphaltenes of an asphalt by incorporating therein n-pentane-insoluble elastomers of higher molecular weight than the average molecular weight of the asphaltenes.

It is a further object of this invention to alter the viscosity characteristics of the maltenes by adding thereto an n-pentane-soluble elastomer.

It is a further object of this invention to increase the viscosity and alter the rheological properties of an asphalt by adding thereto a pentane-soluble elastomer which by analysis forms part of the paraffins fraction of the maltenes of the asphalt.

It is a further object of this invention to improve the quality of an asphalt by adding thereto a blend of a pentane-soluble and a pentane-insoluble elastomer to adjust the average molecular weight of the asphaltenes by incorporating the pentane-insoluble elastomer and the viscosity of the maltenes by the addition of a pentane-soluble elastomer.

I have thus found that the addition of an elastomeric polymer which will form part of the asphaltenes fraction can affect the molecular weight of the pentane-insoluble fraction, i.e., the asphaltenes, and that addition of any elastomer soluble in maltenes overpowers the effect of the maltenes composition given by the parameter $(N + A_1)/(P + A_2)$.

The prior art has been concerned with naturally-occurring asphaltenes fractions of molecular weights in the range of 2,000 to 10,000, which results in an average molecular weight of the pentane asphaltenes of 2,000 to 6,000. I have now found that by increasing the molecular weight range of any of the asphalt constituents which is normally below the range of 10,000 causes an increase in the abrasion resistance to produce an asphalt of superior properties as compared with the asphalt to which the polymer is added and that the rheological properties can be altered by using polymers of different type.

The addition of a maltenes-soluble elastomer of high-molecular weight above 10,000 causes an increase in the molecular weight of the asphaltenes and/or an increase in the viscosity of the separated maltenes fraction and simultaneously an increase in the abrasion resistance of the asphalt. Addition of a higher-molecular weight normal pentane-soluble polymer also decreases the temperature susceptibility of the so-modified asphalt, as can be seen from the low temperature data shown in Table VIII.

Where, in the specification and claims, I refer to the polymer added to the asphalt, I exclude the asphaltenes $A_{5C}$, $A_{7C}$ and $A_{9C}$ as such polymers.

The chemical nature of the polymer determines where the polymer ends up in the system. In terms of the chemical analysis employed, a polymer insoluble in n-pentane will become part of the asphaltenes fraction, while a polymer which is soluble in n-pentane will become part of the solvent or the gelling agent, the latter of which is usually determined as paraffins. For example, a primarily saturated elastomer, such as butyl rubber, which is substantially poly(isobutylene) containing only a small amount of isoprene will show up and function as a gelling agent. This is of particular value in improving an asphalt deficient in fraction (P), when such asphalt is to be rubberized to increase abrasion resistance and at the same time be changed from a sol asphalt to a gel asphalt. Natural rubber, for example, which is chemically poly(isoprene), an unsaturated hydrocarbon rubber soluble in n-pentane, functions as a modifier of the maltenes affecting primarily the maltenes viscosity, while a styreneended poly(styrene)-poly(diene)-poly(styrene) block copolymer, which is insoluble in pentane, modifies the asphaltenes fraction. Thus, if a polymer of the latter type is incorporated into an asphalt, it will function like a high-molecular weight asphaltenes fraction. If natural rubber is added, it will function as a high-molecular weight portion of the fractional component solvent correcting the deficiencies in maltenes viscosity. Modifying the asphalt by the addition of styrene-butadiene copolymers, which are not poly(styrene) ended and are referred to in the literature as SBR, or in the earlier literature as GR-S, which polymer is also mostly soluble in pentane, results also in a modification of the maltenes fraction.

Examples of n-pentane-insoluble styrene-ended block polymers, which may be used, are given in Table III.

Such block copolymers are depicted by the symbols which refer to the composition of the blocks of monomers which enter into the formation of the copolymer. Block copolymers employed in the examples are the result of copolymerization of blocks of monomers which are produced in an initial step of homopolymerization. Examples of such types of copolymers generally included within the term "SBR" block copolymers are copolymers having configurations such as are described below.

When the homopolymer poly(butadiene) has the configuration $(b)_n = B$, and poly(styrene) has the configuration $(s)_n = S$, block copolymers of these homopolymers have the configuration S-B

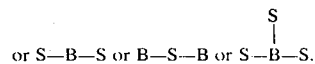

Thermoplastic block copolymers, illustrated by those employed in the following examples are of the S-B-S or

type, in which the end blocks are the relatively rigid blocks S and the inner block is the elastic chain-like block B. Such polymers are herein referred to as poly(styrene)-ended block copolymers.

TABLE III

| Type* | B/S (1) | %S (2) | I.V. (3) | (4) | MS-4 Viscosity(5) | Brookfield psi(6) | Tensile Strength %(6) | Elongation |
|---|---|---|---|---|---|---|---|---|
| CD-821 | 65/35 | 35 | 1.29 | | 104 at 240° F. | 3600 | 4000 | 810 |
| CD-822 | 60/40 | 38 | 1.45 | | 70 at 270° F. | 7800 | 3350 | 990 |
| CD-823 | 65/35 | 35 | 1.07 | | 101 at 240° F. | 1700 | 3500 | 875 |
| CD-824 | 60/40 | 25 | 1.37 | | 94 at 212° F. | 12,000 | 2750 | 975 |
| CD-825 | 50/50 | 45 | 0.92 | | 46 at 275° F. | 850 | 3400 | 800 |
| CD-957 | 65/35 | 35 | 1.29 | | 104 at 240° F. | 2450 | 4080 | 740 |
| CD-960 | | 28.8 | 1.89 | | | 760 | 2620 | 1000 |
| Solprene 406-01 | | | | | | 3700 | 4250 | 800 |
| Solprene 406-02 | | | | | | 2300 | 4170 | 775 |
| CD-1252 | | | | | 42 at 270° F. | 460 | 4300 | 775 |
| Solprene 406-04 | 60/40 | | | | 38.5 at 270° F. | 535 | 4170 | 840 |
| Solprene 406-05 | 60/40 | | | | 66 at 270° F. | 7675 | 4800 | 830 |

TABLE III — Continued

| Type* | B/S (1) | %S (2) | I.V. (3) | (4) | MS-4 Viscosity(5) | Brookfield psi(6) | Tensile Strength %(6) | Elongation |
|---|---|---|---|---|---|---|---|---|
| Solprene 406-06 | 60/40 | | | | 28 at 270° F. | 600 | 3970 | 840 |
| Solprene 406-08 | 60/40 | | | | | 370 | 3850 | 800 |

(1) Butadiene-styrene ratio.
(2) % Styrene as block.
(3) Inherent viscosity (for definition, see Journal of Colloid Science I. 261-9, May, 1946; reprinted in Rubber Chemistry Tech. XIX (4) 1092-6, October, 1964).
(4) Mooney Viscosity, A.S.T.M. Method D-1646.
(5) Brookfield Viscosity of a 15% solution in trichlorethylene, cP at 77° F., using No. 4 spindle.
(6) A.S.T.M. Method D-412.
*Polymers sold by Phillips Petroleum Company.

An informative paper on the influence of structure and composition on properties of block copolymers has been published by Childers and Kraus in "Rubber Chemistry and Technology" 40, (4) 1183–1199 (September, 1967). Since no claim is made to the polymers per se, and since they have been described in the prior art, it will be sufficient to refer to the above-cited literature and also to U.S. Pat. Nos. 2,975,160; 3,113,912; 3,251,905; 3,231,635; 3,239,478; 3,242,038; 3,265,765; 3,299,174; and 3,333,024, which pertain to block copolymers.

Poly(styrene)-poly(butadiene)-poly(styrene) copolymers, which may be employed in modifying asphalts according to the invention, may be similar to the colymers which have been described in the above-cited patents as having the following characteristics, to wit, conjugated diene blocks of molecular weight between 2,000 and 1,000,000 and the end blocks having molecular weight between 2,000 and 100,000.

Other poly(styrene)-poly(diene)-poly(styrene) block copolymers such as poly(styrene)-poly(acrylonitrile)-poly(styrene); poly(styrene)-poly(isoprene)-poly(styrene), or other combinations of plastic and elastic polymer blocks may also be used. All of the foregoing poly-(styrene)-poly(diene)-poly(styrene) copolymers are poly(styrene)-ended. The end blocks of these three-block copolymers are poly(styrene) blocks and the polymers are distinguished from the poly(styrene)-poly(diene) two-block copolymers in which one end block is a poly(diene) block. They also differ in structure from the other styrene-diene rubbers such as GR-S rubbers in which the styrene and diene monomer units are in random arrangement. An additional pentane-insoluble, maltenes-soluble polymer which may be used is neoprene which is chemically poly(chloroprene). I may also use compatible mixtures of said polymers.

Other polymers besides natural rubber and random SBR rubbers which by composition and asphalt analysis become part of the solvent portion of the asphalt are poly(butadiene) and synthetic poly(isoprene). Vistanex, which is a fully saturated polymer of the poly(isobutylene) type (similar to butyl rubber, which, however, contains a small amount, e.g., 3% of isoprene) becomes substantially part of the gelling agent which is analytically determined as paraffins. Butyl rubber is chemically similar to fraction $(A_2)$ because of its content of a small amount of the unsaturated hydrocarbon isoprene. Since the gelling agent regulates the compatibility of the bodying agent with the solvent, saturated polymers, I found, should be used only in moderate amounts.

Those skilled in the art will be able to substitute for block copolymers, graft polymers as long as they fulfill the requirements of the characteristics for which the block copolymers are chosen, as demonstrated in Table III.

The elastomers which are preferred for use in the composition of my invention to modify the asphaltenes may be characterized as having in their unvulcanized state the following properties: A solution of 15% by weight of the polymer in trichlorethylene should have a viscosity of at least 300 centipoises and may be higher depending on the molecular weight of the polymer. A film cast from trichlorethylene should preferably have a tensile strength of about about 1,000 and more preferably about about 2,000 psi as a minimum and have an elongation at break of at least about 700% by ASTM Method D-412.

For such purposes I may use styrene-ended block copolymers to be all of the same type, or use blends of compatible mixtures of such styrene-ended block copolymers in any proportion which have the aforementioned properties or blends of styrene-ended block copolymers of high strength with extender oils which after blending with extender oils have at least the above stipulated minimal properties.

Examples of the aforesaid poly(styrene)-poly(butadiene)-poly(styrene) block copolymers are given in Table III and elsewhere in this specification. The block copolymers of Table III have butadiene:styrene ratios in the range of 50:50 to 65:35, but these ratios are not critical. A S-B-S block copolymer having a 25:75 styrene:butadiene ratio, sold by Shell Chemical Co. as Kraton 101, may also be used.

Polymers, which are substantially soluble in n-pentane and maltenes, may be of the following character: Natural rubber, Grade No. 1RSS or lower grades of smoked sheets, or pale crepe or brown crepe, etc.; random SBR polymers, such as SBR-1500; synthetic cis-poly(isoprene); poly(butadiene) and other unsaturated hydrocarbon rubbers. Synthetic rubber SBR-1500 is described in ASTM Designation D-1418-02T. It is sold by Goodrich Chemicals, Inc. as Ameripol 1500 and by others under different proprietary names. The synthetic cis-poly(isoprene) used in my tests is sold by Goodyear Chemical Division as NATSYN 200. ASTM lists a great number of equivalent polymers.

These may be classed as unsaturated polymers which are chemically similar in reactivity to the reactive fractions of the maltenes and will analytically be determined as such.

I may use also compatible mixtures of the foregoing n-pentane soluble polymers. I may use the foregoing n-pentane soluble polymers, or mixtures thereof, with the n-pentane insoluble polymers or mixtures thereof.

EXAMPLE 1

Example 1 illustrates the improvement in terms of increased durability obtained by addition of polymers. The properties of the base asphalts modified are shown in Table IV.

TABLE IV

IDENTIFICATION OF ASPHALTS USED

| Origin | | BOSCAN (B) (VENEZUELA) | SAN JOAQUIN VALLEY (V) (CALIFORNIA) |
|---|---|---|---|
| Penetration | | 64 | 58 |
| Viscosity, poises | at 77° F. | 3,500,000 | 2,070,000 |
| | at 140° F. | 4,922 | 1,870 |
| | at 275° F. | 6.89 | 2.45 |
| Microductility at 77° F. (mm) | | 54 | 63 |
| Chemical Composition, | A(%) | 27.8 | 10.9 |
| | N(%) | 26.6 | 41.5 |
| | $A_1$(%) | 21.5 | 14.2 |
| | $A_2$(%) | 17.8 | 20.7 |
| | P(%) | 6.3 | 12.7 |
| Molecular Weight of A | | 3630 | 2715 |
| $(N+A_1)/(P+A_2)$ | | 2.00 | 1.67 |
| Durability Group (see Table I for ratings). | | V | IV |

A number of solutions and emulsions containing various elastomers in oil used in my experiments are set forth in Table V.

The medium lube distillate had a viscosity of 80 Saybolt Universal Seconds (SUS) at 210° F.

The extract from medium lube distillate had a viscosity of 90 SUS as 210° F., and the heavy cylinder stock had a viscosity of 150 SUS at 210°F. The nitrogen bases derived from gilsonite was supplied under the designation GN-104 by the American Gilsonite Company. The heavy lube distillate had a viscosity of 150 SUS at 210° F.

I have also used in preparing useful solutions of polymers in oils in addition to the foregoing a distilled extract $SO_2$ refining of a cracked oil which is chemically closely related to a hydrocarbon oil of truly aromatic character in distinction to so-called rubber extender oils which are more of a terpene-like structure. The difference between these hydrocarbon types can be detected by their refractive index or the computed value, $\Delta n_D$, as set forth in the paper "Determination of the Hydrocarbon Type of Petroleum Products" published in Rubber Age (N.Y.), Vol. 70, No. 6, Pages 735-747, March, 1952. The $\Delta n_D$ for the distilled $SO_2$ extract was 0.135. The chemical composition of the oil is not critical as long as the oil is a good solvent for both the asphalt and polymer. The reason for this freedom from dependency on oil composition ratio is given by the fact that improvement in asphalt quality is accomplished by polymer addition and not by the type of oil used.

TABLE V

| IDENTIFICATION | | | | |
|---|---|---|---|---|
| SOLUTION | EMULSION | POLYMER TYPE | % POLYMER CONTENT OF OIL PHASE | OIL |
| | 4 | None | None | 50% SAE-50 Medium lube distillate, $\Delta n_D$=−0.059 50% Extract from medium lube distillate, $\Delta n_D$=−0.092 |
| | 41(23) | Natural rubber, No. 1 RSS | 5 | ditto |
| | 42 | ditto | 7.5 | ditto |
| | 36 | SBR-1500 | 5 | ditto |
| 35 | 37 | ditto | 7.5 | ditto |
| | 38 | ditto | 10 | ditto |
| | 18 | Synthetic cis-poly(isoprene) | 5 | ditto |
| 7 | 24 | Synthetic trans-poly(isoprene) | 10 | ditto |
| | 20 | SBR block copolymer (35/65 S/B ratio) | 10 | ditto |
| 10 | 26 | SBR block copolymer (40/60 S/B ratio) | 10 | ditto |
| | 22 | SBR block copolymer (50/50 S/B ratio) | 10 | ditto |
| | 46 | SBR block copolymer (25/75 S/B ratio) | 5 | ditto |
| 45 | 47 | ditto | 7.5 | ditto |
| | 48(25) | ditto | 10 | ditto |
| | 67 | ditto | 7.5 | 89% Heavy cylinder |

TABLE V—Continued

| IDENTIFICATION | | | % POLYMER | |
|---|---|---|---|---|
| SOLU-<br>TION | EMUL-<br>SION | POLYMER TYPE | CONTENT<br>OF OIL PHASE | OIL |
| | 3599 | ditto | 7.5 | stock $\Delta n_D = -0.066$<br>11% Nitrogen bases*<br>from Gilsonite<br>75% Heavy lube dis-<br>tillate $\Delta n_D = -0.081$<br>25% Extract from<br>medium lube distillate |

*Nitrogen bases from Gilsonite having
the following typical properties:
Initial boiling point at 760 mm. Hg. — 226° F.
Chemical composition (ASTM Method D2006)
A — 2.3%
N — 91.1%
$A_1$
$A_2$ + P — 2.4%

Table VI reports the test data obtained by adding of polymers to the two asphalts defined in Table IV. The data show that all the polymers used will improve the abrasion resistance of both asphalts. The first column in Table VI identifies the asphalt, the second column gives the $(N + A_1)/(P + A_2)$ ratio of the asphalt. The following columns give the type and amount of polymer added, the result of the abrasion test, and the Durability Groups. The asphalt-polymer mixtures were subjected to the pellet abrasion tests according to the procedure described below. It will be observed that the addition of polymer to the asphalt improves the durability of the asphalt markedly. The introduction of the high-molecular-weight polymer overpowers the effect of the maltenes parameter $(N + A_1)/(P + A_2)$. The same results were obtained by using blends of polymers such as S-B-S plus natural rubber, S-B-S plus GR-S, neoprene plus natural rubber, natural rubber plus butyl, etc. The data do not show the effects of individual polymers or blends of polymers on the three functional components labeled bodying agent, solvent, and gelling agent.

The abrasion tests were conducted employing the procedure described in the following publications:

Rostler, F. S. and R. M. White, "Influence of Chemical Composition of Asphalts on Performance, Particularly Durability," Symposium on Road and Paving Materials - 1959, *American Society for Testing and Materials Special Technical Publication* 277, pp. 64–88 (1960); Rostler, F. S., and R. M. White, "Composition and Changes in Composition of Highway Asphalts, 85–100 Penetration Grade, "*Proc. Association of Asphalt Paving Technologists*, 31, pp. 35–89 (1962); and Halstead, W. J., F. S. Rostler and R. M. White, "Properties of Highway Asphalts - Part III, Influence of Chemical Composition," *Proc. Association of Asphalt Paving Technologists*, 35, pp. 91–138 (1966).

TABLE VI

| Base<br>Asphalt | $\frac{N+A_1}{P+A_2}$ | Polymer Added (5) | Abrasion Test<br>Results<br>Average (mg/rev.) | Durability Groups | |
|---|---|---|---|---|---|
| | | | | by<br>Composition | by<br>Performance |
| B | 2.00 | None | 6.734 | V | V |
| | | 0.75% random SBR(1) | 0.736 | V | III |
| | | 0.75 % natural rubber(2) | 0.888 | V | III |
| | | 0.5% synthetic poly(isoprene)(3) | 1.398 | V | III |
| | | 0.75% S-B-S(4) | 0.926 | V | III |
| V | 1.67 | None | 3.870 | IV | V |
| | | 0.75% random SBR(1) | 0.058 | IV | I |
| | | 0.75% natural rubber(2) | 0.318 | IV | I |
| | | 0.5% synthetic poly(isoprene)(3) | 0.414 | IV | II |
| | | 0.75% S-B-S(4) | 0.248 | IV | I |

(1)SBR-1500
(2)No. 1 ribbed smoked sheets
(3)Natsyn
(4)Solprene 406-08
(5)As an aqueous emulsion of a blend of oil and polymer containing 15% polymer by weight.

EXAMPLE 2

The following asphalts designated as No. 56, 3, 105, 91 and 92, identified by the same numbers in the article entitled "Composition and Changes in Composition of Highway Asphalts 85–100 Penetration Grade," Rostler and White, Proceedings of the Association of Asphalt Paving Technologists, Vol. 35, pp. 35, et seq. (1966), and asphalts designated as Composites I–V identified in the article by Halstead Rostler and White, supra, were treated to incorporate controlled amounts of polymers into them. These asphalts representative of the five durability groups defined in Table I were treated with emulsions containing polymers in solution in maltenes. The polymer employed was a pentane-insoluble poly(styrene)-poly(butadiene)-poly(styrene) block copolymer.

Cationic emulsifiers were used in making the emulsions.

The test procedure was the same as in the preceding example. The results are given in Tables VII and VIII.

TABLE VII

EFFECTS OF POLYMER ADDITION ON INDIVIDUAL SPECIMENS

| ASPHALT DESIGNATION | | | ABRASION LOSS at 77°F., mg/rev. | | | | |
|---|---|---|---|---|---|---|---|
| BPR No. | Durability Group | $N+A_1 \over P+A_2$ | Control 0.0% Polymer | 0.5% Polymer | 0.75% Polymer | 1.0% Polymer | 1.5% Polymer |
| 56 | I | 0.71 | mixed<br>aged**<br>average | 0.003<br>0.004<br>0.004 | 0.000<br>0.003<br>0.002(1) | 0.002<br>0.000<br>0.001(1) | 0.001<br>0.003<br>0.002(1) | 0.001<br>0.000<br>0.001(1) |
| 3 | II | 1.12 | mixed<br>aged**<br>average | 0.024<br>0.394<br>0.209 | 0.015<br>0.231<br>0.123(1) | 0.016<br>0.152<br>0.084(1) | 0.015<br>0.069<br>0.042(1) | 0.012<br>0.024<br>0.018(1) |
| 105 | III | 1.21 | mixed<br>aged**<br>average | 0.259<br>1.897<br>1.078 | 0.065<br>1.369<br>0.717(4) | 0.026<br>0.669<br>0.348(3) | 0.025<br>0.424<br>0.224(2) | 0.008<br>0.048<br>0.028(1) |
| 91 | IV | 1.55 | mixed<br>aged**<br>average | 1.145<br>2.634<br>1.890 | 0.221<br>1.051<br>0.636(4) | 0.054<br>0.420<br>0.237(3) | 0.035<br>0.335<br>0.185(1) | 0.012<br>0.061<br>0.036(1) |
| 92 | V | 1.78 | mixed<br>aged**<br>average | 1.810<br>3.812<br>2.811 | 0.589<br>3.295<br>1.942(6) | 0.392<br>2.198<br>1.295(5) | 0.253<br>1.716<br>0.984(4) | 0.065<br>0.944<br>0.504(3) |

*Specimen identification.
**7 days at 140° F.
(1) Group No. I
(2) Group No. I - II
(3) Group No. II
(4) Group No. III
(5) Group No. III - IV
(6) Group No. IV

TABLE VIII

EFFECT OF POLYMER ADDITION ON COMPOSITE SPECIMENS OF 85–100 PENETRATION GRADE ASPHALT

| Asphalt Designation | | Abrasion Loss at 77° F., mg/rev. | | | | Abrasion Loss at 50° F., mg/rev. | | | |
|---|---|---|---|---|---|---|---|---|---|
| | | Control | 0.75% Polymer | 1.0% Polymer | 1.5% Polymer | Control | 0.75% Polymer | 1.0% Polymer | 1.5% Polymer |
| Composite I | mixed<br>aged 7 da.<br>average | 0.009<br>0.049<br>0.029 | 0.005<br>0.016<br>0.010 | 0.001<br>0.013<br>0.007 | | 2.798<br>4.265<br>3.532 | 1.706<br>3.968<br>2.837 | 1.306<br>2.359<br>1.832 | |
| Composite II | mixed<br>aged 7 da.<br>average | 0.049<br>0.810<br>0.430 | 0.015<br>0.263<br>0.139 | 0.024<br>0.153<br>0.088 | | 4.130<br>9.653<br>6.892 | 1.774<br>5.513<br>3.644 | 1.734<br>3.644<br>2.689 | |
| Composite III | mixed<br>aged 7 da.<br>average | 0.249<br>2.997<br>1.623 | | 0.025<br>1.379<br>0.702 | 0.014<br>0.207<br>0.110 | 3.775<br>12.49<br>8.132 | | 1.589<br>7.193<br>4.391 | 1.374<br>3.367<br>2.370 |
| Composite IV | mixed<br>aged 7 da.<br>average | 0.848<br>3.430<br>2.139 | | 0.062<br>1.947<br>1.004 | 0.030<br>1.190<br>0.610 | 6.889<br>21.19<br>14.04 | | 3.007<br>8.621<br>5.814 | 2.232<br>6.548<br>4.390 |
| Composite V | mixed<br>aged 7 da.<br>average | 1.333<br>4.436<br>2.884 | | 0.186<br>2.426<br>1.306 | 0.124<br>1.144<br>0.634 | 8.227<br>22.37<br>15.30 | | 2.474<br>11.62<br>7.047 | 2.255<br>5.781<br>4.018 |

EXAMPLE 3

The effect of the various types on the functional groups defined as bodying agent, solvent and gelling agent are shown in the following experiments which demonstrate that the pentane-insoluble elastomers become part of the bodying agent while the pentane-soluble elastomers become part of the maltenes, which in turn comprise the solvent and the gelling agent.

In conducting the experiments a 25% solution of the S-B-S polymer and 5% solutions of the other polymers were first prepared. These solutions were then mixed to produce solutions containing 15% polymer in the oil phase consisting of 14% S-B-S and 1% of the other elastomers. A second series of blends was then produced containing 12.5% of S-B-S and 2.5% of the other elastomers, again giving elastomer solutions in maltenes containing a total of 15% elastomer.

Observations of these blends under the microscope at 100X magnification and viscosity of the solutions are reported in Table IX. Column 1 shows the total amount of elastomers used, column 2 the ratios and types of elastomers present. Column 3, reports the compatibilities as evidenced by flocculation of particles and column 4 shows the viscosities measured.

Blends of elastomer solutions containing 2.5% of each of two elastomers giving a total of 5% in maltenes constituted a third series of blends. Table X shows compatibility ratings of these two-elastomer blends for all combinations of pairs of nine elastomers.

The results of these tests show that the pentane-insoluble elastomers tested affect the viscosity much less than the pentanesoluble unsaturated elastomers, and that the pentane-soluble saturated elastomers function as part of the gelling agent.

In the next series of experiments the elastomer solutions were diluted with 40 volumes of n-pentane. The results are shown in Table XI and reveal which elastomers are to be classed as pentane-insoluble and which are soluble, i.e., which are to be considered part of the asphaltenes and which part of the maltenes.

TABLE IX

ELASTOMER SOLUTIONS IN MALTENES

| Elastomer Concentration % | Elastomer Type | Ratio | Rating** of Compatibility at 100X | Brookfield Viscosity, 77° F, cP |
|---|---|---|---|---|
| 0 | Control no elastomer | | 1 | 25 |
| 15 | 3-block S-B-S | 15:0 | 1 | 2580 |
| 15 | 3-block S-B-S + 2-block S-B | 14:1 | 1 | 2682 |
| 15 | 3-block S-B-S + random SBR | 14:1 | 1 | 3345 |
| 15 | 3-block S-B-S + poly(butadiene) | 14:1 | 1 | 3530 |
| 15 | 3-block S-B-S + pale crepe | 14:1 | 3 | — |
| 15 | 3-block S-B-S + smoked sheets | 14:1 | 3 | — |
| 15 | 3-block S-B-S + Butyl | 14:1 | 3 | — |
| 15 | 3-block S-B-S + poly(chloroprene) | 14:1 | 3 | — |
| 15 | 3-block S-B-S + poly(isobutylene) | 14:1 | 5 | — |
| 15 | 3-block S-B-S + 2-block S-B | 12.5:2.5 | 1 | 3045 |
| 15 | 3-block S-B-S + random SBR | 12.5:2.5 | 1 | 5000 |
| 15 | 3-block S-B-S + poly(butadiene) | 12.5:2.5 | 3 | 5375 |
| 15 | 3-block S-B-S + pale crepe | 12.5:2.5 | 4 | — |
| 15 | 3-block S-B-S + smoked sheets | 12.5:2.5 | 4 | — |
| 15 | 3-block S-B-S + Butyl | 12.5:2.5 | 5 | — |
| 15 | 3-block S-B-S + poly(chloroprene) | 12.5:2.5 | 4 | — |
| 15 | 3-block S-B-S + poly(isobutylene) | 12.5:2.5 | 5 | — |

NOTE:
Solutions of all elastomers rated excellent (1) before blending.

*Identification of elastomers used:
   3-block S-B-S, Solprene 406-08 Phillips Petroleum Co.
   2-block S-B, Solprene 1205, Phillips Petroleum Co.
   Poly(butadiene), Cis - 4, Phillips Petroleum Co.
   Pale crepe, No. 1 thick pale crepe natural rubber.
   Smoked sheets, No. 1 ribbed smoked sheets natural rubber.
   Butyl, Enjay Butyl 217, Enjay Chemical Co.
   Poly(chloroprene), Neoprene W, E. I. du Pont de Nemours & Co.
   Poly(isobutylene), Vistanox 100, Enjay Chemical Co.

**Rating:
  1- Compatible
  2- Trace of incompatibility
  3- Slight incompatibility
  4- Definite incompatibility
  5- Incompatible

TABLE X

RATING OF COMPATIBILITY OF 1:1 BLENDS OF 5% ELASTOMER SOLUTIONS IN MALTENES

| | Pale Crepe | Poly-(butadiene) | 3-block S-B-S | Random SBR | 2-block S-B | Poly (chloroprene) | Butyl | Poly (isobutylene) |
|---|---|---|---|---|---|---|---|---|
| Smoked Sheets | 1 | 1 | 1 | 2 | 3 | 5 | 5 | 5 |
| Pale Crepe | — | 1 | 1 | 2 | 3 | 4 | 5 | 5 |
| Poly-(butadiene) | | — | 1 | 2 | 3 | 4 | 4 | 5 |
| 3-block S-B-S | | | — | 2 | 3 | 2 | 4 | 5 |
| Random SBR | | | | — | 3 | 3 | 5 | 5 |
| 2-block S-B | | | | | — | 3 | 4 | 5 |
| Poly-(chloroprene) | | | | | | — | 5 | 5 |
| Butyl | | | | | | | — | 2 |

See Table IX for identification of elastomers and compatibility ratings.

TABLE XI

PRECIPITATION OF ELASTOMERS DISSOLVED IN MALTENES

| Elastomer (5% in Maltenes) | Pentane Dilution (40 Volumes) | Pentane Solution plus Isopropyl Alcohol (2 Volumes) |
|---|---|---|
| Pale Crepe | No precipitate | Precipitate |
| Smoked Sheet | No precipitate | Precipitate |
| Butyl | Slight precipitate | Precipitate |
| Poly(isobutylene) | Slight precipitate | Precipitate |
| Random SBR | Precipitate | Precipitate |
| Poly(butadiene) | Slight precipitate | Precipitate |
| 2-block S-B | Precipitate | No precipitate |
| Poly(chloroprene) | Precipitate | No precipitate |
| 3-block S-B-S | Precipitate | No precipitate |

See Table IX for identification of elastomers.

EXAMPLE 4

In another experiment also reported in Table XI the supernatant solution, i.e., the portion of the solution above the flocculants was diluted with 2 volumes of isopropyl alcohol, which causes any pentane-soluble elastomers to flocculate. The results show that pentane-soluble elastomers become part of the maltenes. The experiments reported in Tables IX, X and XI verify the stipulations made about the different functions of the various elastomers as related to the functional components. The effect of the various polymers on the viscosity of their solutions is shown in Table XII.

TABLE XII

EFFECT OF 5% OF POLYMER ON VISCOSITY OF OIL SOLUTIONS*

| Elastomer Type | Brookfield Viscosity at 77°C. c.P. |
|---|---|
| 3-Block S-B-S Insoluble in n-pentane | 110 |
| Poly(chloroprene) Insoluble in n-pentane | 285 |
| Random S-B-R Partially soluble in n-pentane | 640 |
| Poly(butadiene) Soluble in n-pentane | 1430 |
| Natural rubber, Pale Crepe Soluble in n-pentane | 2300 |
| Butyl, Soluble in n-pentane | 275 |
| Poly(isobutylene) Soluble in n-pentane | 6380 |

*Viscosity of oil 25 c.P.

As in the process according to my U.S. Pat. No. 3,577,250, I prefer to add the elastomers in the form of a cationic emulsion of solutions containing the various polymers.

A great number of cationic surfactants are available which are suitable for use in formulating the emulsion. The cationic surfactant should be a good emulsifying agent and provide a lasting positive charge. Small amounts of a nonionic surfactant can also be added to facilitate emulsification and to minimize foaming. Details are presented in my U.S. Pat. No. 3,577,250.

In my present invention I prefer to employ an emulsion containing in the oil phase selected elastomers or two or more polymers or blends of emulsions. I select the type of the polymer depending on the asphalt properties to be improved. Where two or more polymers are employed, I desired to employ those which are compatible in the desired proportions, as is described above.

The amount of polymers to be incorporated in the asphalt can be grouped in three ranges:

1. by weight of the asphalt, 0.1–2.5%, which is the primary range of this invention;
2. by weight of the asphalt, 2.5–.10%, which is the range used in most current methods; and
3. by weight of the asphalt, over 10%, which might be advantageous if special effects are desired.

The range of up to 2.5% constitutes the most practical amount for producing the greatest benefits. Higher amounts of elastomers impart rubbery properties in a higher degree, but the greatest effect of rubberizing in terms of changes of properties of asphalts is in the range of below 2.5%. Above this range, the improvement of the asphalt by increasing the elastomer content is more gradual.

In using mixtures of the pentane-soluble and pentane-insoluble polymers dissolved in a maltenes fraction, I may combine (styrene)-ended block copolymer or neoprene with the n-pentane soluble polymers. For example, I can combine the two polymers in ratios of 9:1 to 1:9, all based on total polymer at 100%.

In such case, the pentane-insoluble polymer will appear as asphaltenes and the pentane-soluble polymer will appear in the maltenes fraction.

The addition of a reactive polymer soluble in pentane, such as for example natural rubber or a styrene-butadiene random polymer will increase the $N + A_1 + A_2$ functional fraction and thus modify the solvent viscosity.

The oil employed in my preferred embodiment to form the oil polymer block should have an initial boiling point not substantially below about 360° at 760 mm of mercury, as determined by ASTM test method D86, and is one which is substantially free of asphaltenes and having a viscosity of at least 20c Pat 77°F. Oils in the range of 50 to about 200 SUS at 210° F. are generally satisfactory. Preferably, the oil should be soluble in n-pentane, according to the method described in ASTM Designation D2006-65T. It should be compatible with the added polymer. The polymer to be added should be soluble in the oil.

The quantity of elastomer present in the oil may be varied depending upon the amount of elastomer to be combined with the asphalt within the treated asphalt pavement. In general, elastomer concentrations of about 2 to about 25 percent by weight of the oil, and preferably about 7.5 – 15 percent by weight of the oil have been found satisfactory. However, if desired, higher concentrations may be employed — for example, up to 25% or more.

The quantity of water employed in the emulsion can be varied within the scope of my invention, depending upon the treatment to be given a particular asphalt pavement. Thus, for example, an emulsion containing 20–50% by weight of water and 80–50% by weight of the oil phase, including the elastomer dissolved therein may be employed. It, itself, can be applied to asphalt pavement or it can be further diluted with water, e.g., from 0.5 to 4 parts of water per part of emulsion concentrate, prior to its application to the pavement.

The rate of application of the oil emulsion in gallons per square yard per inch of depth of the pavement will depend on the weight of pavement per inch of depth and the asphalt content of the pavement.

I claim:

1. A method of treating asphalt in an asphalt-aggregate structure, said method comprising impregnating said asphalt-aggregate structure by applying to the surface thereof an oil-in-water emulsion, the oil phase being from about 10 to about 80% by weight of the emulsion containing polymer having an average molecular weight in the range above 10,000, said polymer being substantially insoluble in normal pentane, said polymer being in solution in said oil, at a polymer concentration of about 2 to about 25% by weight of said oil, said asphalt and said polymer being mutually soluble in said oil, said oil having an initial boiling point which is not substantially below about 300° C. at 760 mm. Hg., and said oil being substantially free of asphaltenes and substantially soluble in n-pentane.

2. The method of claim 1 in which the polymer is a poly(styrene)-ended poly(styrene)-poly(diene)-poly(styrene) block copolymer.

3. The method of claim 1 in which the polymer is polystyrene ended poly(styrene)-poly(butadiene)-poly(styrene) block copolymer.

4. The method of claim 1 in which the polymer is poly(chloroprene).

5. The method of rubberizing asphalt in an asphalt-aggregate pavement, said method comprising impregnating said asphalt pavement by applying to the surface thereof an oil-in-water emulsion, the oil phase being from about 10 to about 80% by weight of the emulsion containing a dissolved elastomer, substantially insoluble in n-pentane, in an amount ranging between about 2 to about 25% by weight of said oil, said oil having an initial boiling point which is not substantially below about 300° C. at 760 mm Hg., said oil being substantially free of asphaltenes and substantially soluble in n-pentane and said elastomer and said asphalt being mutually soluble in said oil, the quantity of said emulsion applied to said asphalt being sufficient to incorporate said elastomer in said asphalt to at least about 0.1% by weight of the said asphalt.

6. The method of claim 5 in which the polymer is poly(styrene)-ended poly(styrene)-poly(diene)-poly(styrene) block copolymer.

7. The method of claim 5 in which the polymer is poly(styrene)-ended poly(styrene)-poly(butadiene)-poly(styrene) block copolymer.

8. The method of claim 5 in which the polymer is poly(chloroprene).

9. A method of treating asphalt which comprises applying to said asphalt an oil-in-water emulsion comprising as an oil phase, a solution in oil of a polymer or mixture of polymers which are substantially soluble in n-pentane and a polymer or mixture of polymers which are substantially insoluble in n-pentane at a polymer concentration of about 2 to about 25% by weight of the oil, said oil having solvent properties for asphalt and for pentane-soluble polymers and pentane-insoluble polymers, the ratios of the polymers are from 9 parts by weight of polymer which are substantially insoluble in n-pentane to 1 part by weight of polymers which are substantially soluble in n-pentane to a ratio of 1 part by weight of the polymers substantially insoluble in n-pentane to 9 parts by weight of the polymers which are substantially soluble in n-pentane.

10. The process of claim 9 in which the n-pentane insoluble polymer is a poly(styrene)-ended poly(styrene)-poly(diene) poly styrene block copolymer, or mixtures thereof, or poly(chloroprene) or mixtures of poly(styrene)-poly(diene) block copolymers and poly(chloroprene) and said n-pentane soluble polymers is a compatible saturated polymer or SBR synthetic rubber, or natural rubber or synthetic trans-poly(isoprene) or synthetic cis-poly (isoprene) or mixtures of said n-pentane soluble polymers.

11. The process of claim 10 in which the poly(styrene) ended poly styrene-poly(diene)-poly(styrene) block copolymer is poly(isoprene)-poly(butadiene)-poly(styrene) block copolymer.

12. The method of treating an asphaltic surface which comprises applying to said surface of an oil in water emulsion comprising an oil phase consisting essentially of an oil having an initial boiling point which is not substantially below 300° C. at 760 mm. Hg and is substantially free of asphaltenes and is substantially soluble in normal pentane and having solvent properties for asphalt, a mixture of compatible polymers dissolved in said oil phase, said polymers being in concentration of about 2 to about 25% by weight based on said oil phase and a cationic emulsifier, said polymers including a mixture of a polymer which is substantially insoluble in n-pentane and a polymer which is substantially soluble in n-pentane in weight ratio to each other in the range of 9:1 to 1:9.

13. The process of claim 12 in which the said n-pentane substantially insoluble polymer is a poly(styrene)-ended poly(styrene)-poly(diene)-poly(styrene) block copolymer, or mixtures of said copolymers or poly(chloroprene) or mixtures of poly(chloroprene) and said block copolymer or block copolymers.

14. The process of claim 13 in which the polymer which is substantially insoluble in n-pentane is poly(styrene)-ended poly(styrene)-poly(butadiene) block copolymer or mixtures of said block copolymers, or a poly(chloroprene) or mixtures of poly(chloroprene) and said block copolymer or block copolymers.

15. The process of claim 12 in which the polymer, which is substantially soluble in n-pentane, is a compatible saturated polymer or poly(butadiene) or SBR synthetic rubber, or natural rubber or synthetic trans-poly (isoprene) or synthetic cis-poly (isoprene) or mixtures of two or more of the foregoing.

16. The process of claim 15 in which the polymer which is substantially insoluble in n-pentane is poly(styrene)-ended poly(styrene) poly(butadiene) block copolymer, or mixtures of said block copolymers, or a poly(chloroprene) or mixtures of poly(chloroprene) and said block copolymer or block copolymers.

* * * * *